(12) United States Patent
Garcia Ramirez et al.

(10) Patent No.: US 11,007,946 B2
(45) Date of Patent: May 18, 2021

(54) GLOVE BOX ASSEMBLY PROVIDING INCREASED LEG ROOM WHEN OPENED

(71) Applicant: FORD GLOBAL TECHNOLOGIES, LLC, Dearborn, MI (US)

(72) Inventors: Arturo Alberto Garcia Ramirez, Mexico City (MX); Blanca Leticia Garcia Gomez, Cuautitlan Izcalli (MX); Ricardo Daniel Sanchez Lugo, Texcoco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 16/126,613

(22) Filed: Sep. 10, 2018

(65) Prior Publication Data

US 2020/0079292 A1      Mar. 12, 2020

(51) Int. Cl.
*B60R 7/06*      (2006.01)
*B60R 11/00*    (2006.01)

(52) U.S. Cl.
CPC ......... *B60R 7/06* (2013.01); *B60R 2011/0005* (2013.01); *B60R 2011/0082* (2013.01)

(58) Field of Classification Search
CPC .. B60R 7/06; B60R 7/04; B60R 11/00; B60R 2011/0005; B60R 2011/0047; B60R 2011/0082; B60R 2011/0087
USPC .......... 296/37.12, 37.1, 37.8, 37.9, 1.08, 70, 296/24.34; 224/483, 282, 539; 29/428, 29/11, 426.6, 434, 464
See application file for complete search history.

(56) References Cited

U.S. PATENT DOCUMENTS

| | | | | | |
|---|---|---|---|---|---|
| 2,796,310 | A | * | 6/1957 | Anderson | B60R 7/06 312/246 |
| 4,239,277 | A | * | 12/1980 | Oda | B60R 7/06 180/90 |
| 5,192,122 | A | * | 3/1993 | Hill | A47B 49/00 312/267 |
| 5,443,285 | A | * | 8/1995 | Boll | B60K 37/00 224/282 |
| 5,558,385 | A | * | 9/1996 | Gross | B60R 7/06 296/37.12 |
| 5,904,389 | A | | 5/1999 | Vaishnav et al. | |

(Continued)

FOREIGN PATENT DOCUMENTS

| | | |
|---|---|---|
| DE | 10356532 A1 | 7/2005 |
| GB | 2522837 A | 12/2015 |

(Continued)

OTHER PUBLICATIONS

English Machine Translation of DE10356532A1 dated Jul. 7, 2005.

(Continued)

*Primary Examiner* — D Glenn Dayoan
*Assistant Examiner* — Sunsurraye Westbrook
(74) *Attorney, Agent, or Firm* — David Coppiellie; King & Schickli, PLLC

(57) ABSTRACT

A glove box assembly includes a body, a first guideway fixed to a support and first pivot pin carried on the body and adapted for translation along the first guideway. The glove box assembly also includes a first rotation arm connected between the body and the support. A first biasing element biases the first rotation arm toward a position wherein the glove box assembly is open.

16 Claims, 10 Drawing Sheets

(56) References Cited

U.S. PATENT DOCUMENTS

| | | | | |
|---|---|---|---|---|
| 6,152,512 A | * | 11/2000 | Brown | ............... B60R 7/06 |
| | | | | 296/37.12 |
| 9,533,622 B2 | | 1/2017 | Huebner et al. | |
| 9,914,398 B1 | | 3/2018 | Sanders | |
| 2010/0148531 A1 | * | 6/2010 | Evans | ............. E05B 15/022 |
| | | | | 296/37.12 |
| 2011/0169292 A1 | * | 7/2011 | Gayon | ............... B60R 7/06 |
| | | | | 296/37.12 |
| 2016/0297368 A1 | * | 10/2016 | Huebner | ............... B60R 11/00 |
| 2017/0158142 A1 | * | 6/2017 | Oldani | ............... B60R 7/06 |

FOREIGN PATENT DOCUMENTS

| | | |
|---|---|---|
| JP | 2005262943 A | 9/2005 |
| JP | 2008044579 A | 2/2008 |
| JP | 6284449 B2 | 2/2018 |
| KR | 100921074 B1 | 10/2009 |
| WO | WO2013168615 A1 | 11/2013 |

OTHER PUBLICATIONS

English Machine Translation of WO2013168615A1 dated Nov. 14, 2013.
English Machine Translation of JP2005262943A dated Sep. 29, 2005.
English Machine Translation of JP2008044579A dated Feb. 28, 2008.
English Machine Translation of JP6284449B2 dated Feb. 28, 2018.
English Machine Translation of KR100921074B1 dated Oct. 8, 2009.

* cited by examiner

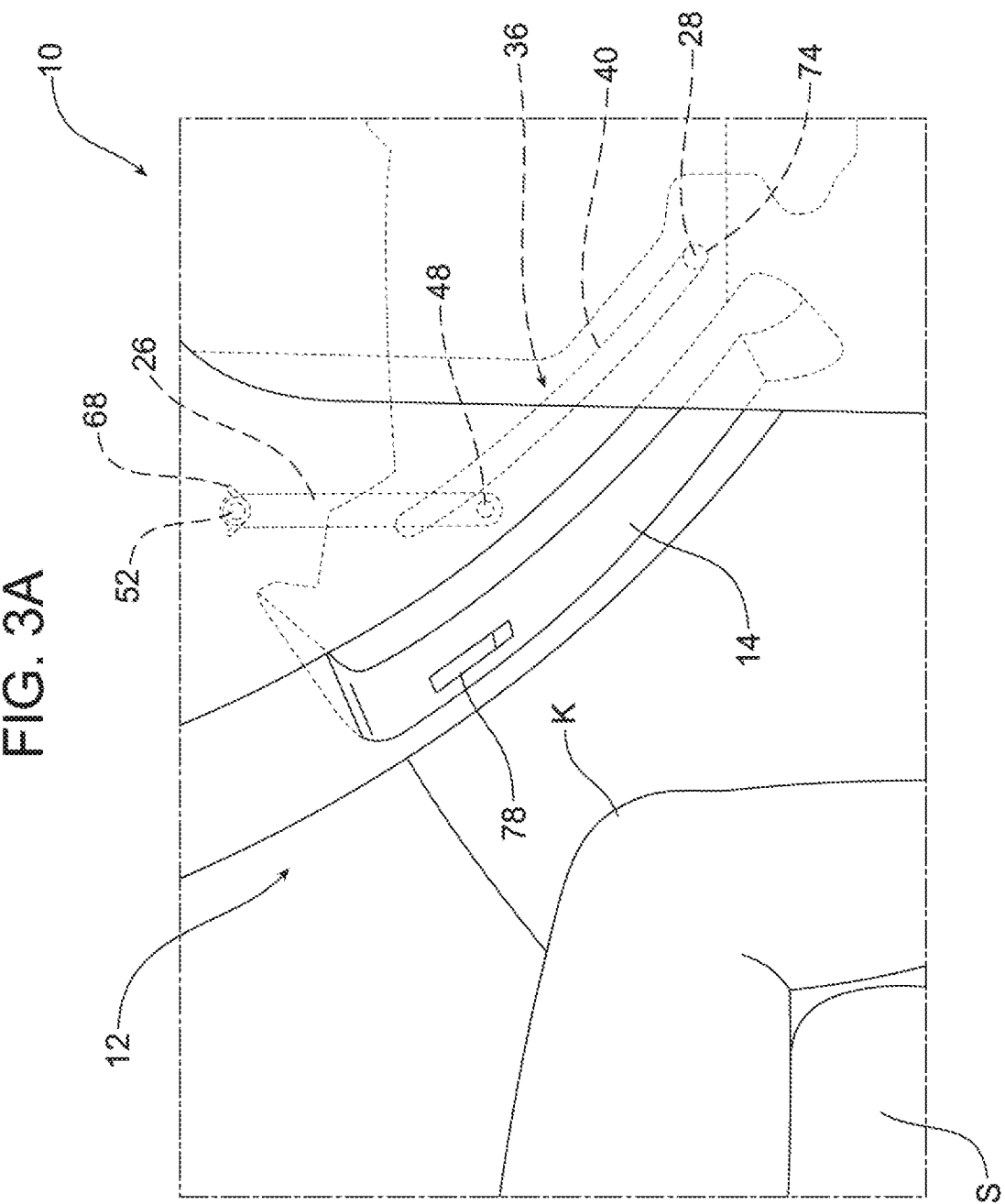

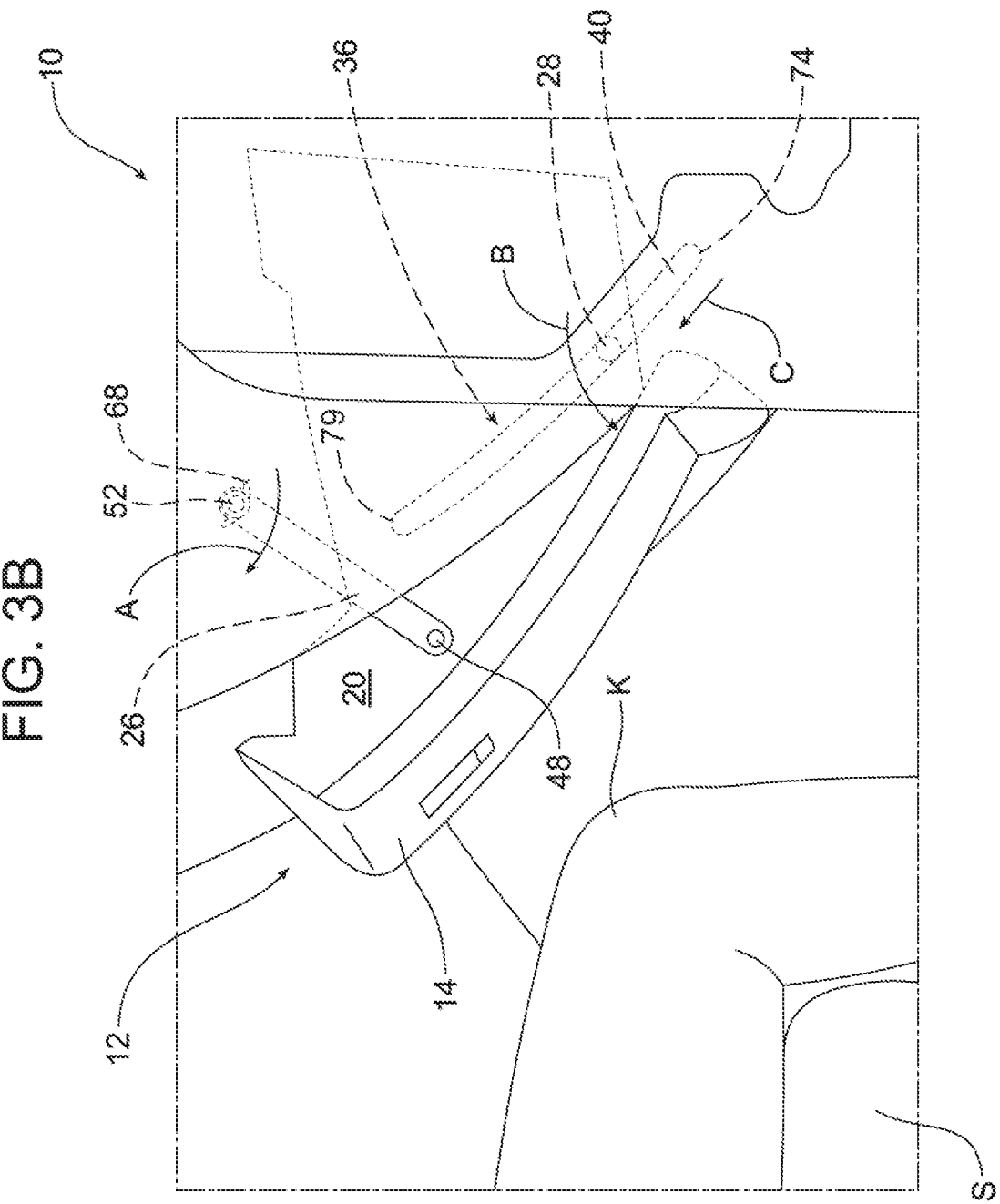

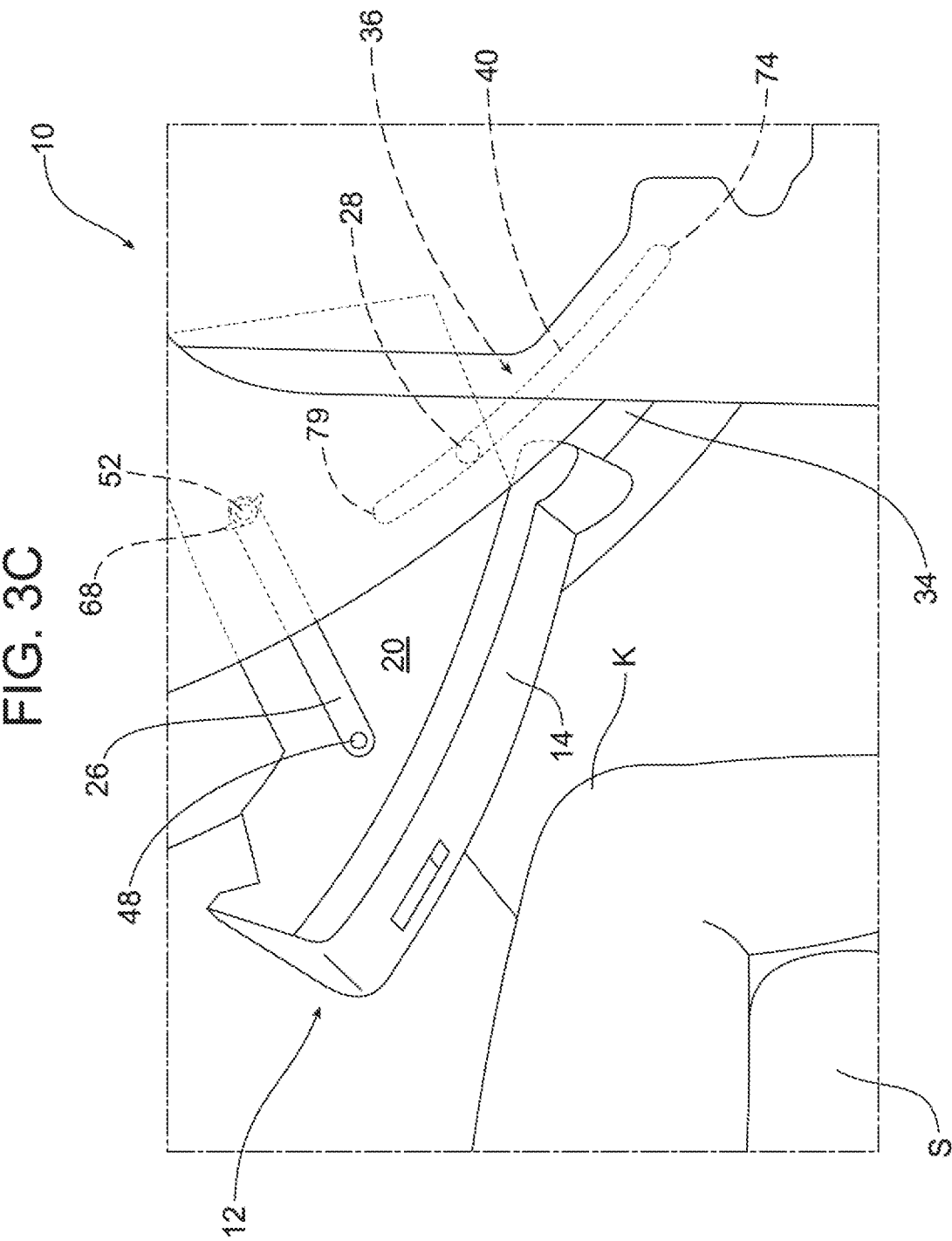

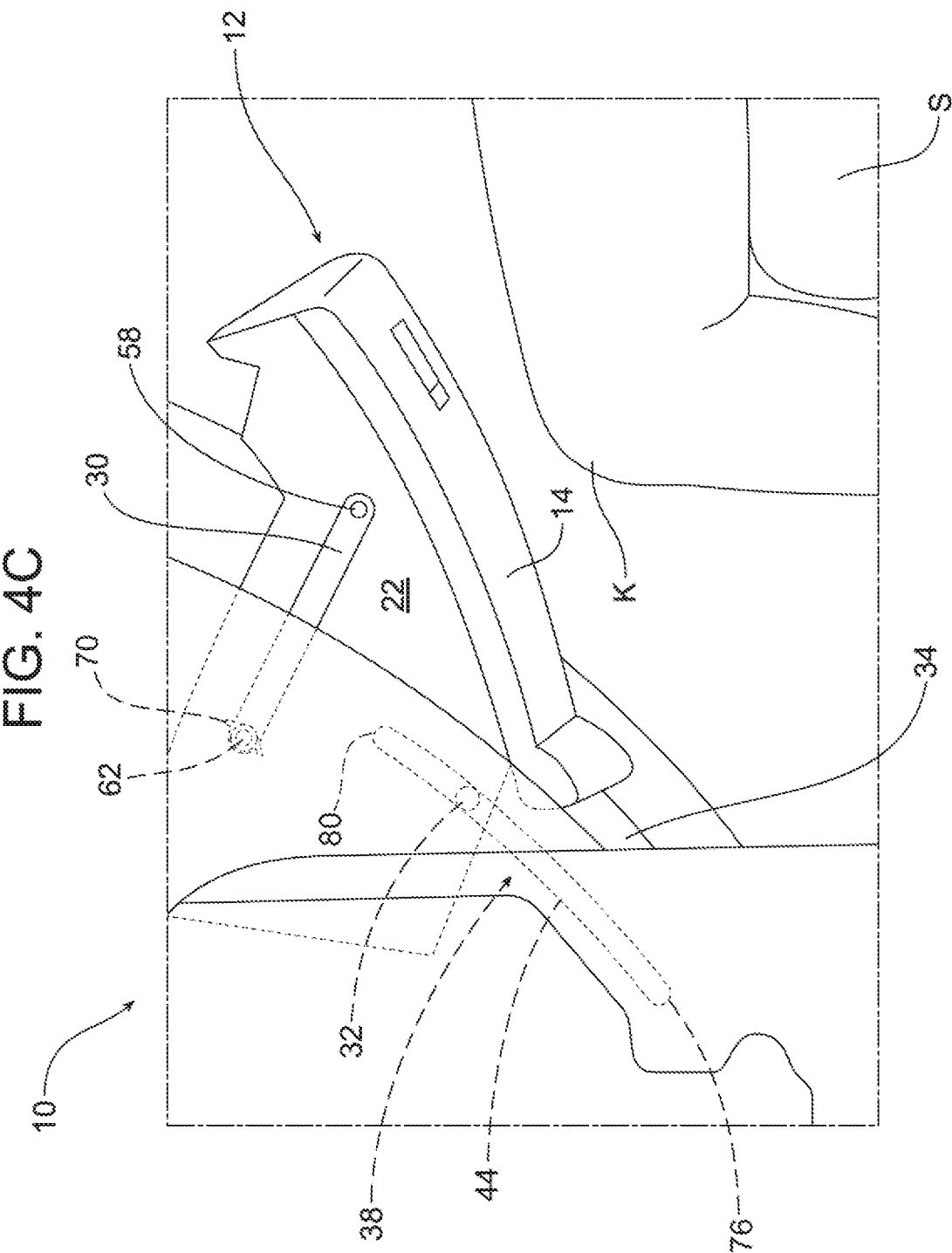

GLOVE BOX ASSEMBLY PROVIDING INCREASED LEG ROOM WHEN OPENED

TECHNICAL FIELD

This document relates generally to the motor vehicle equipment field and, more particularly, to a new and improved glove box assembly that is relatively simple and inexpensive to produce and that provides for additional clearance for the legs and knees of a motor vehicle occupant sitting in an adjacent seat when the glove box assembly is opened to access the contents therein.

BACKGROUND

The legs and, more particularly, the knees of a passenger sitting in the passenger seat of a motor vehicle directly rearward of a glove box often interfere with the full opening of the glove box. This document relates to a new and improved glove box assembly that is adapted or configured to provide additional clearance for the legs and knees of an individual sitting in an adjacent seat of the motor vehicle so as to allow the glove box to be fully opened to freely access the contents therein without discomforting the passenger.

SUMMARY

In accordance with the purposes and benefits as described herein, a new and improved glove box assembly is provided. That glove box assembly comprises: (a) a body, (b) a first guideway fixed to a support, (c) a first pivot pin carried on the body and adapted for translation along the first guideway, (d) a first rotation arm connected between the body and the support and (e) a first biasing element biasing the first rotation arm toward a position wherein the glove box assembly is opened.

The body may include a storage compartment. The first biasing element may be a first torsion spring. In addition, the glove box assembly may further include a first pivot connecting a first end of the first rotation arm to the body and a second pivot connecting a second end of the first rotation arm to the support. That first torsion spring may be concentrically received around the second pivot.

The glove box assembly may further include a second guideway fixed to the support. Further, the glove box assembly may further include a second pivot pin carried on the body and adapted for translation along the second guideway.

Still further, the glove box assembly may further include a second rotation arm connected between the body and the support. Further, the glove box assembly may include a second biasing element biasing the second rotation arm toward the position wherein the glove box assembly is open. That second biasing element may comprise a second torsion spring.

The glove box assembly may further include a third pivot connecting a first terminus of the second rotation arm to the body and a fourth pivot connecting a second terminus of the second rotation arm to the support. That second torsion spring may be concentrically received around the fourth pivot.

The first guideway and the first rotation arm may be provided at a first side of the body. The second guideway and the second rotation arm may be provided at a second side of the body. In one particularly useful embodiment the first guideway may include a first longitudinal slot in the support and the second guideway may include a second longitudinal slot in the support.

In the following description, there are shown and described several preferred embodiments of the glove box assembly. As it should be realized, the glove box assembly is capable of other, different embodiments and its several details are capable of modification in various, obvious aspects all without departing from glove box assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the glove box assembly and related method and together with the description serve to explain certain principles thereof.

FIG. 3A is a perspective view illustrating the glove box assembly and showing the first rotation arm and first pin in the first guideway when the glove box assembly is in the closed position.

FIG. 3B is a view similar to FIG. 3A but showing the glove box assembly and related structures in a partially opened position.

FIG. 3C is a view similar to FIGS. 3A and 3B but showing the glove box assembly in a second partially opened position wherein the body of the glove box assembly is more open than in the first partially open position illustrated in FIG. 3B.

FIG. 4C is a view similar to FIG. 3C showing the glove box assembly in a second partially opened position from the opposite or second side.

Figure 1:
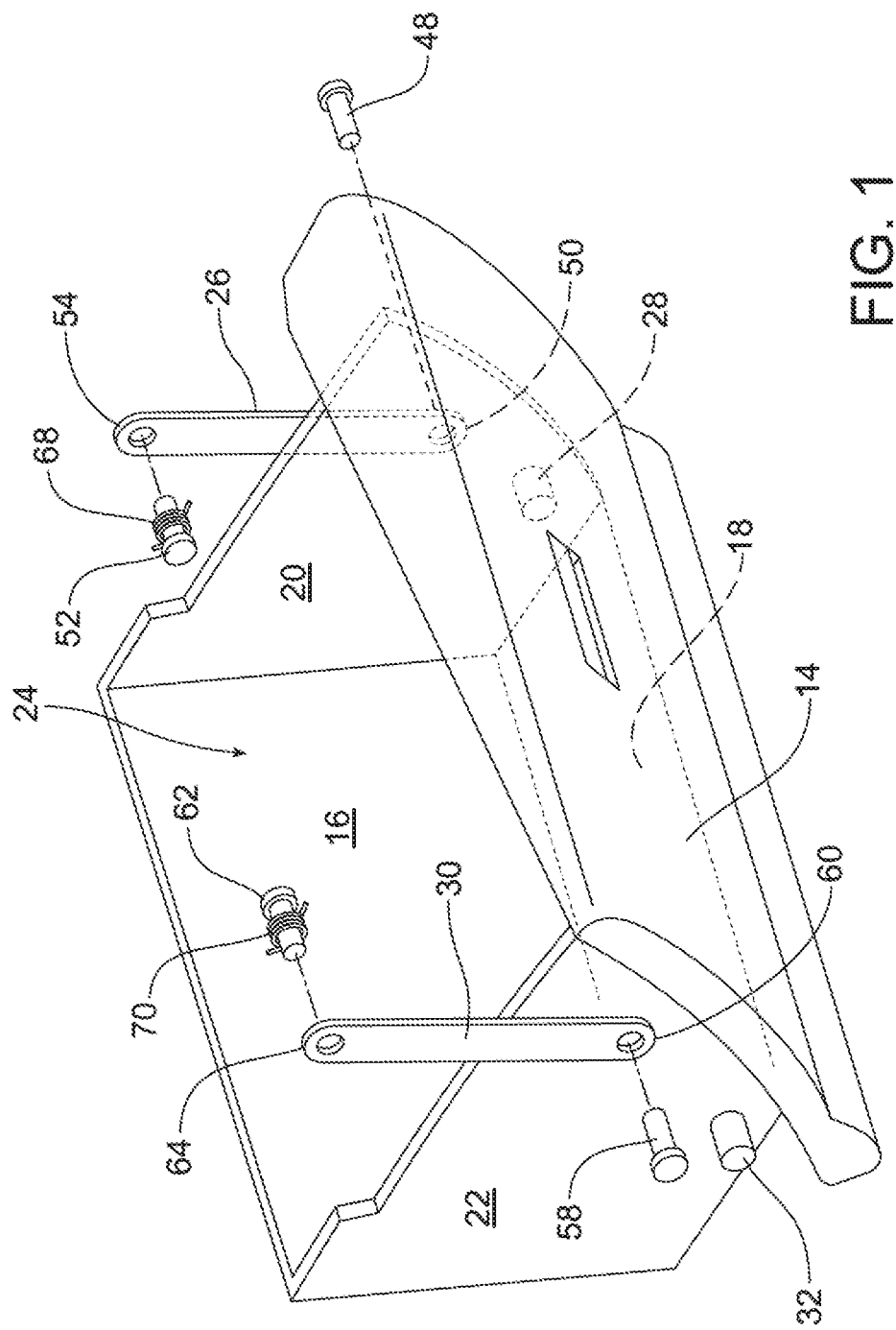
FIG. 1 is a detailed perspective view of the body of the glove box assembly illustrating the first rotation arm, the second rotation arm, the first pivot pin and the second pivot pin.

Reference will now be made in detail to the present preferred embodiments of the glove box assembly, examples of which are illustrated in the accompanying drawing figures.

DETAILED DESCRIPTION

Reference is now made to FIGS. 1, 2, 3A-3D and 4A-4D illustrating the new and improved glove box assembly 10. As best illustrated in detail in FIG. 1, that glove box assembly comprises a body 12 having a front face 14, a rear wall 16, a bottom wall 18, a first sidewall 20 and a second sidewall 22 defining a storage compartment 24. A first rotation arm 26 and a first pivot pin 28 are provided at the first sidewall 20. A second rotation arm 30 and a second pivot pin 32 are provided at the second sidewall 22.

Figure 2:
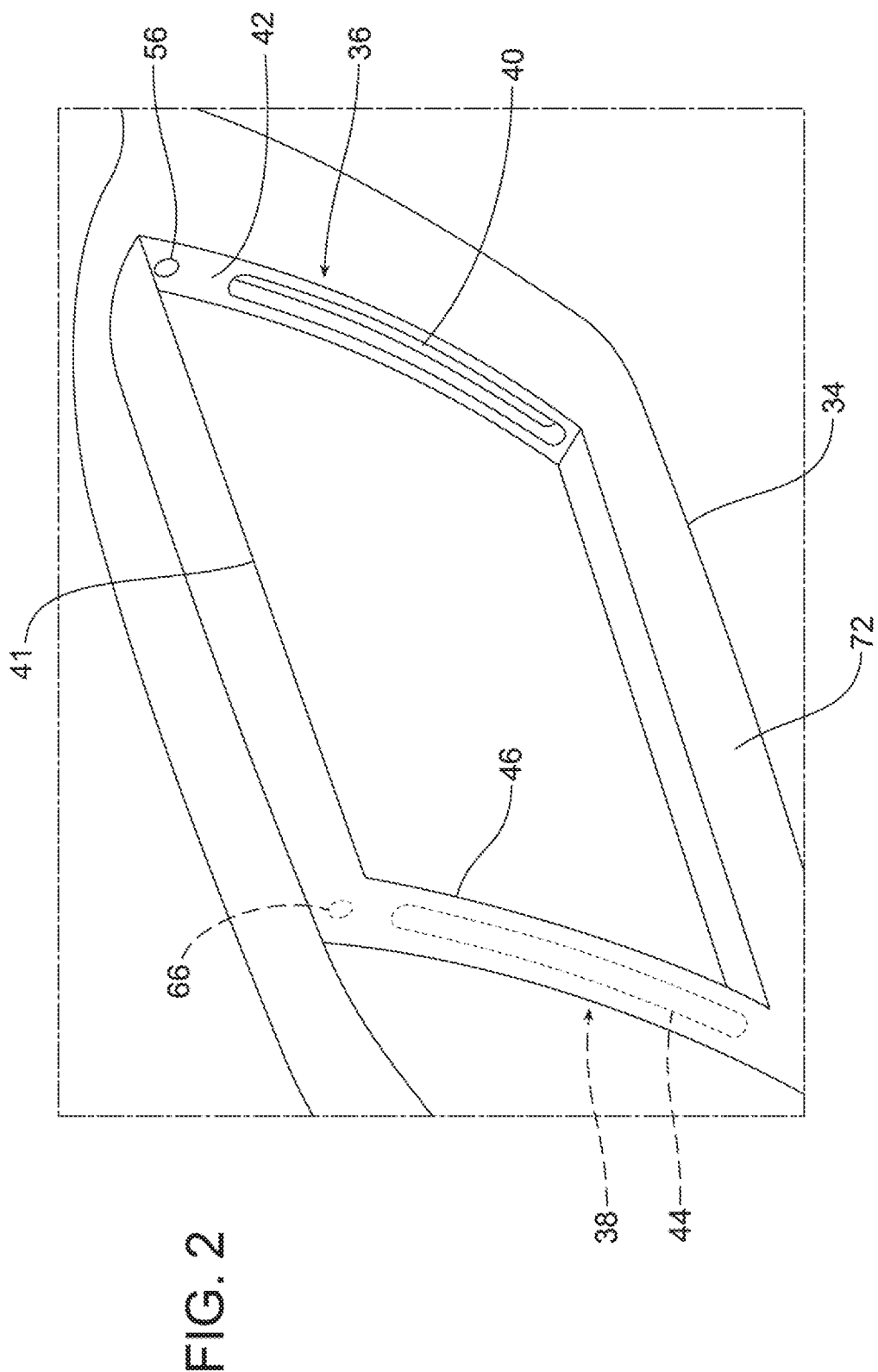
FIG. 2 is a detailed perspective view of the support illustrating the first guideway and the second guideway.

As illustrated in FIG. 2, a support 34 for the body 12 of the glove box assembly 10 includes a first guideway 36 and a second, opposed guideway 38. In the illustrated embodiment, the support 34 is a dashboard including an opening 41 for the body 12 of the glove box assembly 10. The first guideway 36 is provided at a first end of the opening 41 while the second guideway 38 is provided at the second opposite end. More particularly, in the illustrated embodiment, the first guideway includes a first longitudinal slot provided in a first flange 42 of the support 34 while the second guideway 38 comprises a second longitudinal slot 44 provided in a second flange 46 of the support.

As illustrated in FIG. 1, a first pivot 48 connects a first end 50 of the first rotation arm 26 to the first sidewall 20 of the body 12. A second pivot 52 connects a second end 54 of the first rotation arm 26 to the pivot receiver 56 provided in the first flange 42 of the support 34 above the first longitudinal slot 40. A third pivot 58 connects the first terminus 60 of the second rotation arm 30 to the second sidewall 22 of the body 12. A fourth pivot 62 connects the second terminus 64 of the second rotation arm 30 to the pivot receiver 66 in the flange 46 of the support 34 above the second longitudinal slot 44. In the illustrated embodiment, the two pivot receivers 56, 66 are both apertures in the respective flanges 42, 46 of the support 34.

A first biasing element 68, in the form of a first torsion spring, is concentrically received around the second pivot 52. A second biasing element 70, in the form of a second torsion spring, is concentrically received around the fourth pivot 62. As will be described in greater detail below the first biasing element 68 and the second biasing element 70 respectively bias the first rotation arm 26 and second rotation arm 30 toward the position illustrated in FIGS. 3D and 4D wherein the glove box assembly 10 is fully opened with the body 12 projecting rearwardly toward the operator.

As should be appreciated, when the body 12 of the glove box assembly 10 is properly seated and mounted to the support 34, the first pivot pin 28 carried on the body 12 is received and adapted for translation along the first guideway 36/first longitudinal slot 40. Similarly, the second pivot pin 32 is received in and adapted for translation along the second guideway 38/second longitudinal slot 44.

Figure 3D:
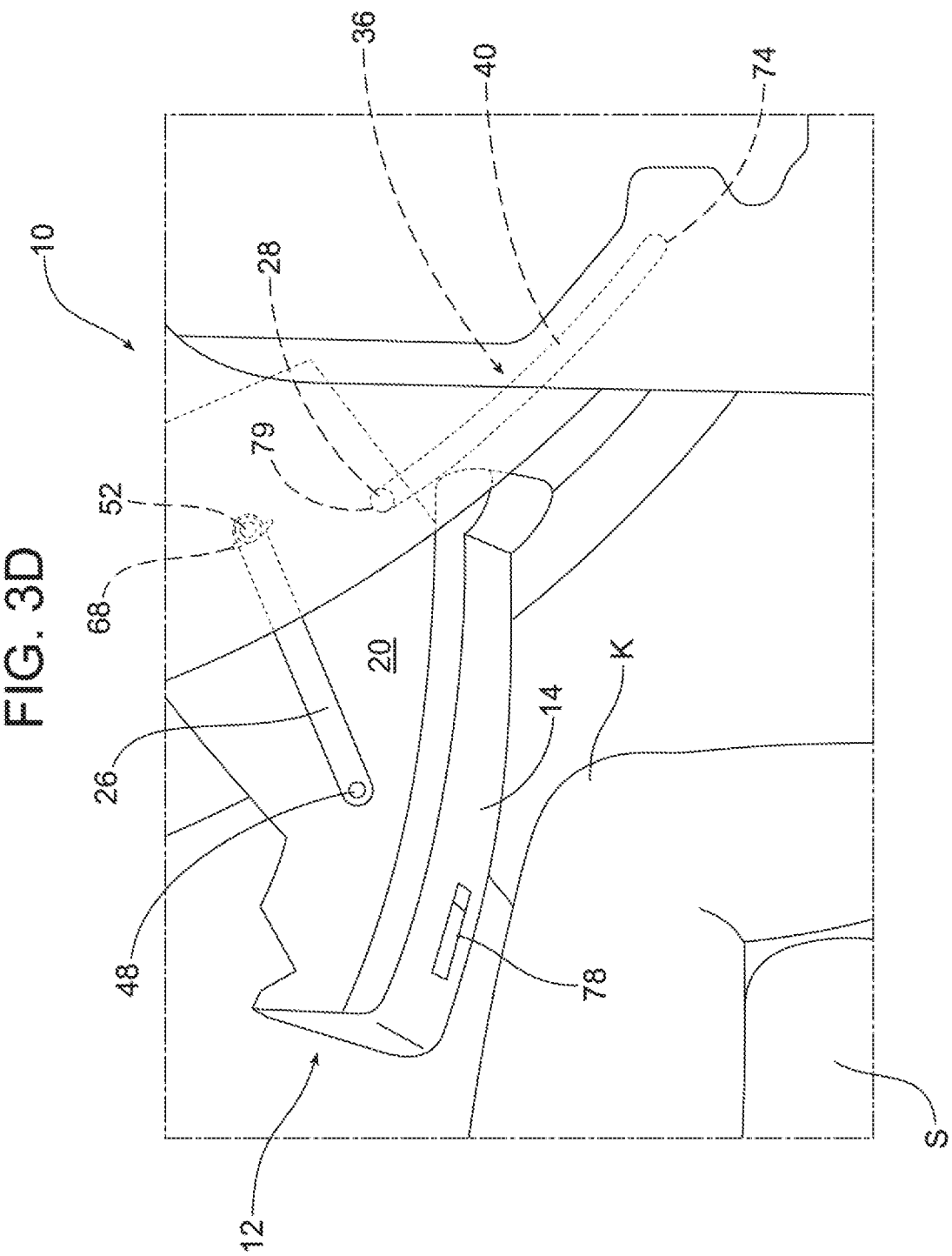
FIG. 3D is a view similar to FIGS. 3A-3C but showing the glove box assembly and, more particularly, the orientation of the first rotation arm and first pivot pin in the first guideway where the glove box assembly is in the fully opened position.
Figure 4A:
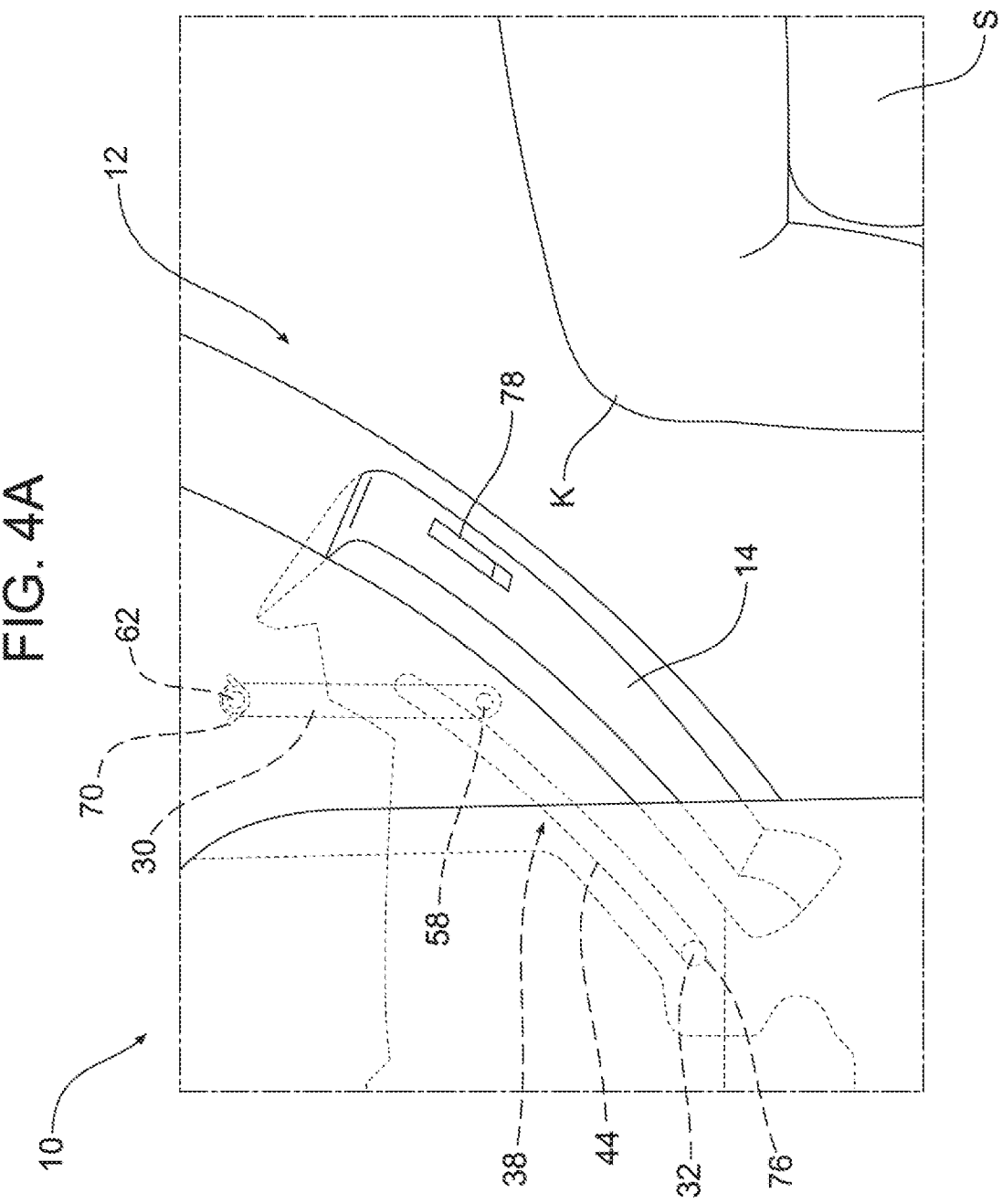
FIG. 4A is a view similar to FIG. 3A but showing the second rotation arm and second pin in the second guideway when the glove box assembly is in the closed position.
Figure 4B:
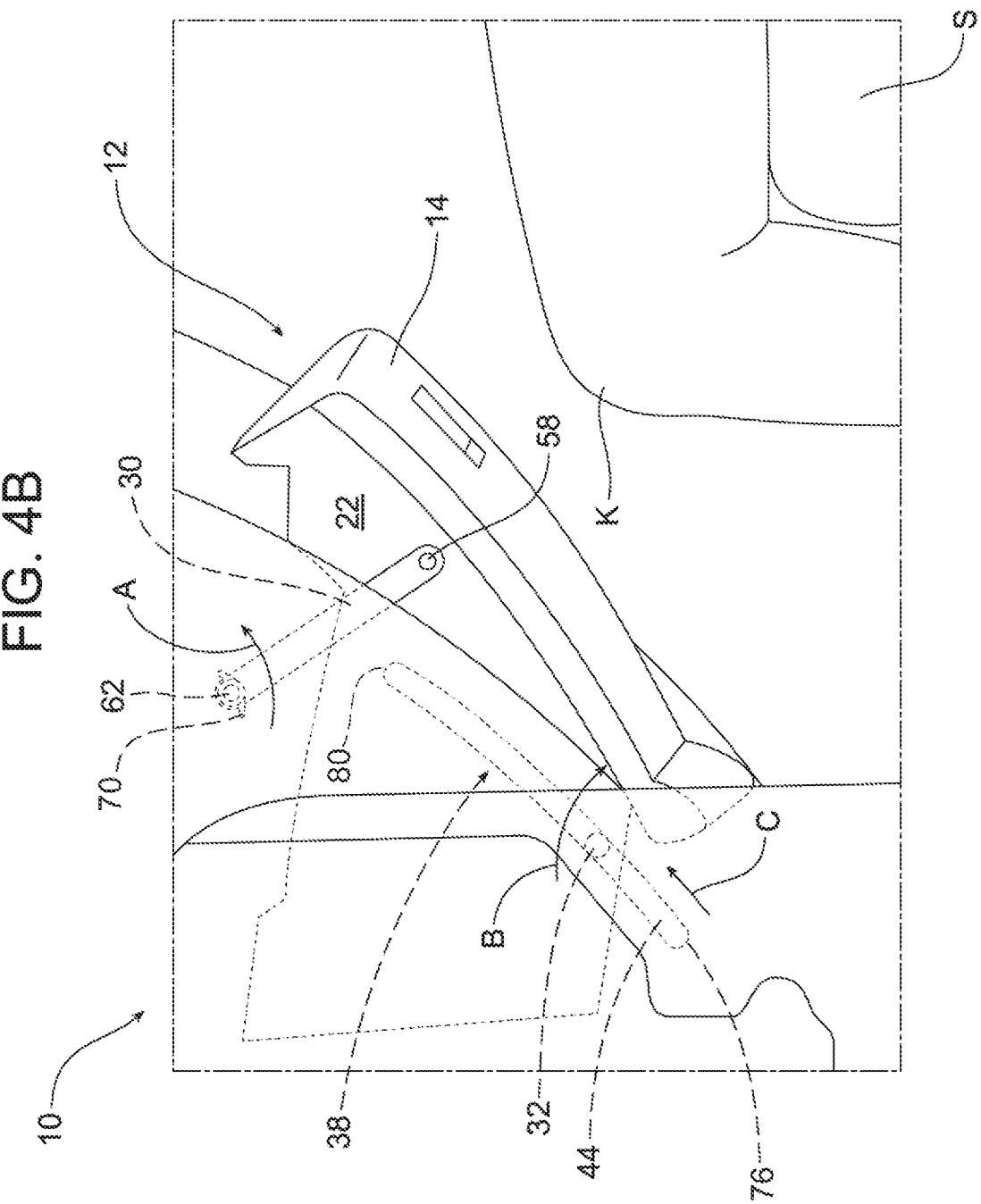
FIG. 4B is a view similar to FIG. 3B showing the glove box assembly in a partially opened position from the opposite or second side.

Reference will now be made to FIGS. 3A-3D and 4A-4D which illustrate the operation of the glove box assembly 10. More particularly, FIGS. 3A and 4A illustrate the body 12 of the glove box assembly 10 when the glove box assembly 10 is in the fully closed position so that the front face 14 of the body fits flush with the facing 72 of the support 34. In this position, the first pivot pin 28 is located at the bottom end 74 of the first guideway 36 (see FIG. 3A). Similarly, the second pivot pin 32 is located at the bottom end 76 of the second guideway 38 (see FIG. 4A). The two rotation arms 26, 30 are oriented in a substantially vertical position and biasing energy is stored in the first and second biasing elements 68, 70.

The operator manipulates the latch 78 to unlock the glove box assembly 10. Upon releasing the latch 78, the first and second biasing elements 68, 70 bias the respective first and second rotation arms 26, 30 to pivot about the respective second pivot 52 and fourth pivot 62 in the direction of action arrows A causing the body 12 to pivot about the first pivot pin 28 and second pivot pin 32 partially open (note action arrows B). See FIGS. 3B and 4B. At the same time the first pivot pin 28 and the second pivot pin 32 translate upwardly in the direction of action arrow C along the respective first guideway 36 and second guideway 38. Accordingly, it should be appreciated that the body 12 is displaced upwardly away from the knees K of the operator seated in the motor vehicle seat S directly motor vehicle rearward of the glove box assembly 10. In this way additional clearance is provided for the opening of the glove box assembly 10.

Figure 4D:
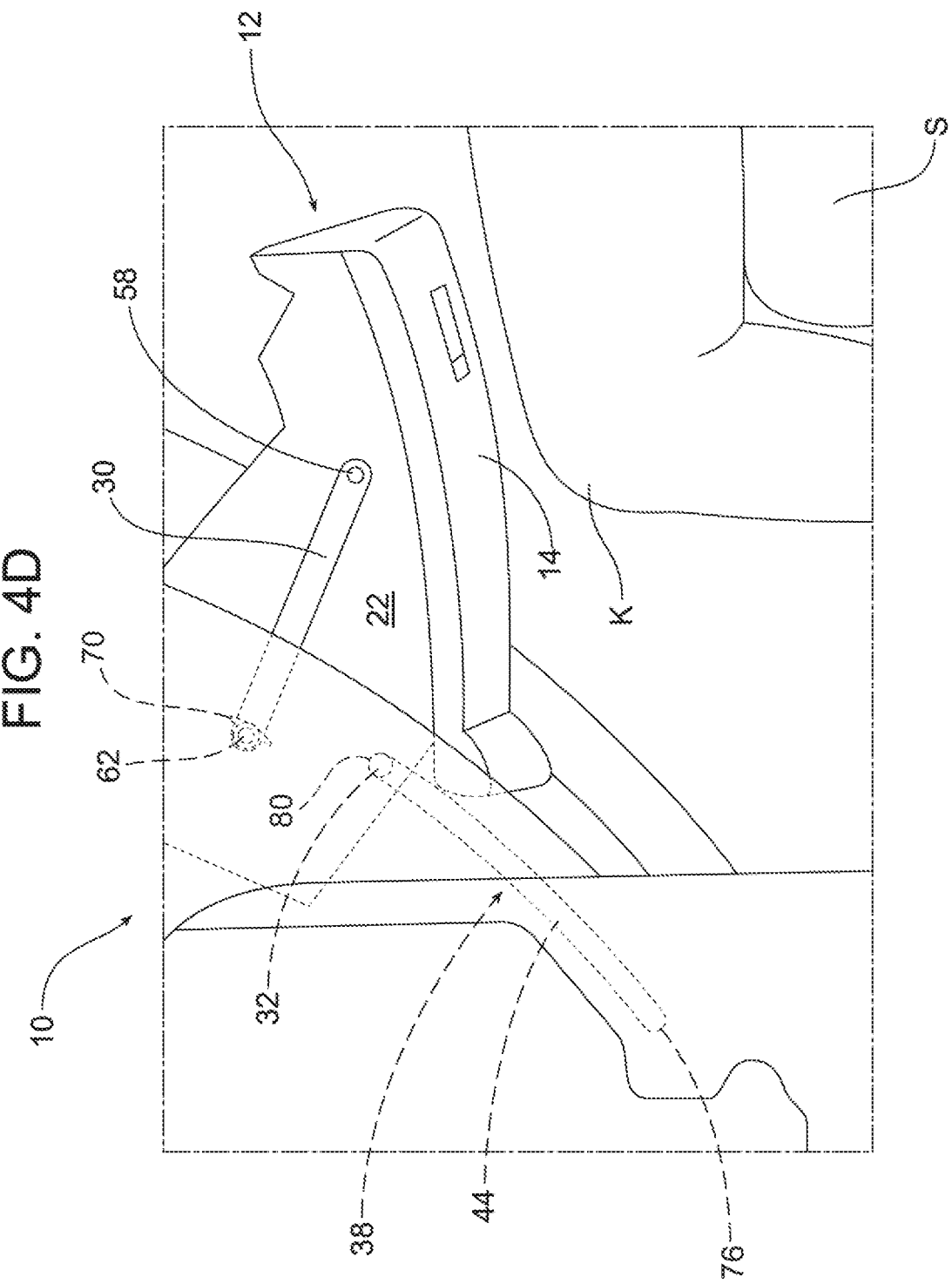
FIG. 4D is a view similar to FIG. 3D illustrating the glove box assembly and, more particularly, the orientation of the second rotation arm and the second pivot pin in the second guideway when the glove box assembly is in the fully opened position.

FIG. 3C illustrates the orientation of the body 12, the first rotation arm 26 and the first pivot pin 28 along the first guideway 36 as the first and second biasing elements 68, 70 continue to bias the glove box assembly 10 and, more particularly, the body 12 toward the open position. Similarly, FIG. 4C illustrates the orientation of the body 12, the second rotation arm 30 and the second pivot pin 32 along the second guideway 38 as the first and second biasing elements 68, 70 continue to bias the body 12 toward the fully opened position. Note the pivot axis for the body 12 defined by the first pivot pin 28 and second pivot pin 32 continues to rise upwardly along the respective first and second guideways 36, 38 as the body 12 pivots further open under the force of the biasing element 68, 70. When the body 12 is fully opened as shown in FIGS. 3D and 4D, the first pivot pin 28 has translated along the entire length of the first guideway 36/first longitudinal slot 40 to the second or upper end 79 thereof. Similarly, the second pivot pin 32 has translated along the full length of the second guideway 38/second longitudinal slot 44 to the second or upper end 80 thereof. Thus, when the body 12 is fully opened, it provides sufficient clearance to allow opening without contacting the knees K of the operator sitting in the seat S.

As should be appreciated from the foregoing description, the glove box assembly 10 includes biasing elements 68, 70 that function to provide a biasing force to displace the body from the fully closed position illustrated in FIGS. 3A and 4A to the fully opened position illustrated in FIGS. 3D and 4D. As the body 12 is opened, the body 12 pivots about a rotational axis defined by the first pivot pin 28 and second pivot pin 32 that translates upward along the first guideway 36 and second guideway 38 from the lowermost ends thereof 74, 76 to the upper most ends thereof 79, 80. Thus, it should be appreciated as the body 12 is displaced toward the opened position, the body rises upward to provide increased leg room and clearance so as to avoid contact with the knees K of the operator sitting motor vehicle rearward of the glove box assembly 10 in the seat S. This better allows the glove box assembly 10 to be fully opened to allow access to the contents held in the storage compartment 24 without adversely affecting the comfort of the operator. Accordingly, the glove box assembly 10 represents a significant advance in the art.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A glove box assembly for a motor vehicle, comprising:
    a body having a front face substantially flush with a support in a closed position;
    a first guideway fixed to the support;

a first pivot pin carried on said body and adapted for translation along said first guideway;

a first rotation arm connected between said body and said support; and a first biasing element biasing said first rotation arm toward an open position wherein said front face extends away from the support such that said glove box assembly is open.

2. The glove box assembly of claim 1, wherein said body includes a storage compartment.

3. The glove box assembly of claim 2, wherein said first biasing element is a first torsion spring.

4. The glove box assembly of claim 3, further including a first pivot connecting a first end of said first rotation arm to said body and a second pivot connecting a second end of said first rotation arm to said support.

5. The glove box assembly of claim 4, wherein said first torsion spring is concentrically received around said second pivot.

6. The glove box assembly of claim 5, further including a second guideway fixed to said support.

7. The glove box assembly of claim 6, further including a second pivot pin carried on said body and adapted for translation along said second guideway.

8. The glove box assembly of claim 7, further including a second rotation arm connected between said body and said support.

9. The glove box assembly of claim 8, further including a second biasing element biasing said second rotation arm toward said open position wherein said glove box assembly is open.

10. The glove box assembly of claim 9, wherein said second biasing element is a second torsion spring.

11. The glove box assembly of claim 10, further including a third pivot connecting a first terminus of said second rotation arm to said body and a fourth pivot connecting a second terminus of said second rotation arm to said support.

12. The glove box assembly of claim 11, wherein said second torsion spring is concentrically received around said fourth pivot.

13. The glove box assembly of claim 12, wherein said first guideway and first rotation arm are provided at a first sidewall of said body.

14. The glove box assembly of claim 13, wherein said second guideway and second rotation arm are provided at a second sidewall of said body.

15. The glove box assembly of claim 14, wherein said first guideway includes a first longitudinal slot in said support.

16. The glove box assembly of claim 15, wherein said second guideway includes a second longitudinal slot in said support.

* * * * *